Sept. 17, 1940. L. C. WOLCOTT 2,215,415
BATTERY TERMINAL
Filed Aug. 26, 1937 2 Sheets-Sheet 1

INVENTOR
LESLIE C. WOLCOTT
BY
Spencer, Hardman & Fehr
ATTORNEYS

Sept. 17, 1940.  L. C. WOLCOTT  2,215,415
BATTERY TERMINAL
Filed Aug. 26, 1937  2 Sheets-Sheet 2

INVENTOR
LESLIE C. WOLCOTT
BY
Spencer, Hardman & Fehr.
ATTORNEYS

Patented Sept. 17, 1940

2,215,415

UNITED STATES PATENT OFFICE 2,215,415

BATTERY TERMINAL

Leslie C. Wolcott, Warren, Ohio, assignor to General Motors Corporation, Detroit, Mich., a corporation of Delaware Application August 26, 1937, Serial No. 160,948

5 Claims. (Cl. 173—259)

This invention relates to terminal members for storage battery connectors, and has particular reference to battery terminal clamps cast of soft metal, such as lead, or an alloy of lead and other elements, and which clamps are to be attached to a terminal post by clamp means incorporating a screw device.

In a battery terminal clamp of the type indicated, there is a tendency for the clamp portions of the terminal to be thrown out of alignment or parallelism, when clamping force is exerted on the arms, that results in the flow or squeezing of the soft metal into engagement with the threads of the screw device. In the usual form of clamp, when the screw device is operated, the clamp arms are drawn out of parallelism so that the opposed surfaces of the arms, or their free ends, tend to converge at a point outside of the clamp, which causes the bores through the clamp arms to be thrown out of alignment and bind on the shank or threaded portion of the screw device. In some instances this binding is sufficient to cause bending of the screw device, especially where the clamp member is formed of relative hard metal. In some instances the extreme clamping of the arms causes fracture and even breakage of the ring portion of the member thus requiring early replacement of the terminal clamp. It has been found that many of these faults may be obviated, if the arms of the clamp can be maintained in substantial parallelism throughout the clamping operation.

Another fault that obtains with the clamps of the prior art, is the tendency of the soft metal to yield under the force applied in tightening the screw device, to the extent that the hard nut bites into the arm and carves away portions of the arm. This occurs principally when the connection is being made by a careless operator, who works with the sole idea that he must make the connection tight. Acting under that impression, the operator is almost sure to run down the clamp device beyond the point required for a tight connection, resulting in either deformation of the clamp arms, and/or tearing away of some of the material of the clamp arm adjacent the nut.

It is therefore an object of the instant invention to provide a battery terminal clamp that will be relatively free from fracture while it is being clamped in place upon a battery post.

It is another object of this invention to provide a battery terminal clamp that will be relatively free from binding effect between the clamp arms and the clamping device.

Another object of this invention is to provide a battery terminal clamp that will be relatively free from corrosive effects of the electrolyte about the clamping device.

A further object of this invention is to provide a battery terminal clamp that will make effective contact with the terminal post of the battery, without any attendant deformation of the parts, and that will be readily releasable from the battery terminal post upon loosening of the clamping device.

Another object of this invention is to provide a battery terminal and clamp means that will eliminate carving away of the clamp arms when the clamp device is operated beyond the point of efficient clamping.

Another object of this invention is to provide means in a battery terminal member for preventing injury to the clamp arms when the terminal is fixed in place.

Further objects and advantages of the present invention will be apparent from the following description, reference being had to the accompanying drawings wherein a preferred embodiment of the present invention is clearly shown.

Figure 1:
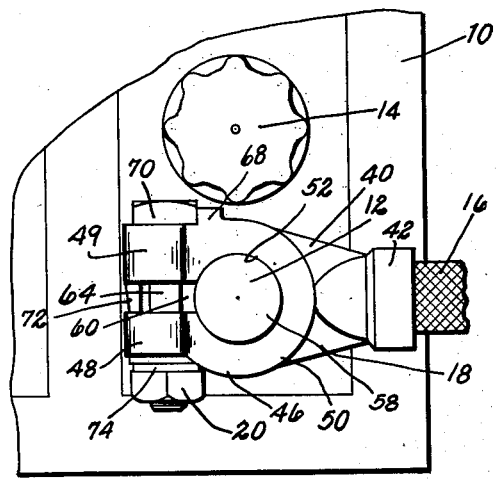
Fig. 1 is a fragmentary plan view of a battery showing a terminal clamp, incorporating the instant invention, attached thereto.

With particular reference to the drawings, 10 indicates a battery providing a terminal post 12 and a cell cap 14, all of which is structure well known to those experienced in the art. For conducting the current stored in the battery to selected devices, a battery lead or connector 16 is provided that is coupled to the battery post 12 in good conductive relation, by means of a terminal clamp member 18, that includes a screw or clamp device 20 for attaching the clamp member to the battery post.

In order to accomplish the several objects hereinbefore proposed, the battery clamp member 18 is carefully designed to incorporate the stated features. The terminal clamp member 18 herein disclosed, comprises a casting of soft metal, such as an alloy of lead and antimony, and at the time of formation is cast about the bared end 22 of the battery lead 16, and so as to enclose a reinforcing strip 24, as well as the end portion of the insulation of the conductor 16.

Figure 7:
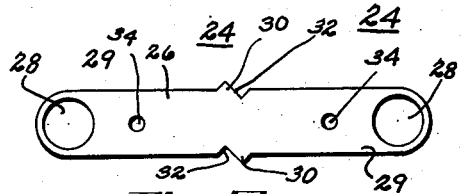
Fig. 7 is a plan view of the blank used as a reinforcing member in a battery terminal clamp.
Figure 6:
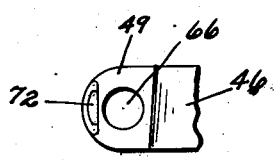
Fig. 6 is a fragmentary view of one of the clamp arms showing features of the invention in detail, it being a view substantially as indicated by the line and arrows 6—6 of Fig. 2.
Figure 8:
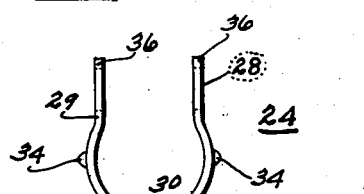
Fig. 8 illustrates the form of the reinforcing strip preparatory to being inserted in the mold for casting.
Figure 9:
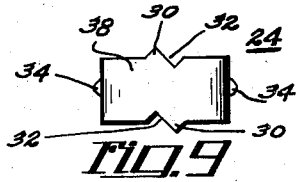
Fig. 9 is an end view of the reinforcing member.

The particular form of the reinforcing strip 24 is illustrated in Figs. 7 and 8, that view in Fig. 7 illustrating the completed blank as the element is struck from sheet metal prior to being formed into the U-shaped member as shown in Fig. 8. It is preferred that the stock from which the strip 24 is fashioned shall be devoid of any appreciable spring-back function, for which reason a quality of metal known as dead soft steel is used. As to configuration, the reinforcing member 24 comprises an elongated strap 26 bearing large apertures 28 at each end 29, while its middle portion is fashioned to provide the oppositely extending projections 30, and inwardly extending notches or cut-away portions 32. The extreme width of the strap 26 at the region of the projections 30 is slightly less than the overall thickness of the completed clamp member, and the notches 32 reduce the overall width of the strap to effect a more complete bond between the layers of cast metal on each side of the insert, while but two notches have been shown, a greater number can be added if desired. At points intermediate the apertures 28 and the lateral extensions 30, portions are struck up from the plane of the strap to form pimples 34, substantially as indicated in Figs. 8 and 9. When the strip has thus been provided, it is bent into U-form substantially as indicated in Fig. 8, wherein the leg portions 36 terminate with the apertures 28 in substantial alignment, and the bight 38 is substantially coincident with the notched portion as illustrated. This positions the pimples 34 on the outer surface of the leg, and disposes them in substantially diametrical relation as respects the locus of the bend.

Figure 3:
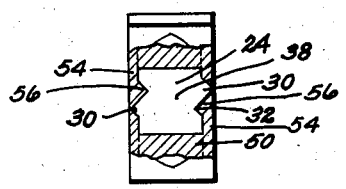
Fig. 3 is a transverse sectional view through the shank of the clamp member substantially as indicated by the line and arrows 3—3 of Fig. 2.
Figure 4:
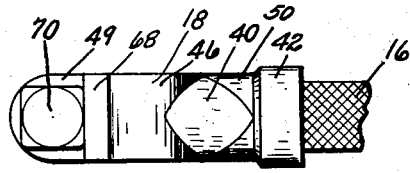
Fig. 4 is a view in side elevation, substantially as indicated by arrow 4 of Fig. 2.

With the reinforcing strip so fashioned, and having been dipped or lead coated, it is placed in the mold cavity in proper adjusted relation with respect to the battery lead 16, whereupon the cooperating cavity members are closed and the molten lead or casting metal introduced into the cavity under pressure. The reinforcing member 24 being so positioned is thereby properly centered with respect to the mold cavity such that the molten metal substantially completely surrounds each and every part of the reinforcing member. The edge extensions 30, along with a draw pin passing through the apertures 28, space the edge portions of the insert from the mold elements, while the pimples 34 insure spacing of the wider portions of the insert from the walls of the mold elements, and insure that the molten metal will be substantially equally distributed in layers on all sides of the insert, substantially as indicated in Fig. 3.

By casting a terminal with the described insert, the insert is held in a substantially central location without the use of external means, which supporting means always leave unsightly holes in the casting which must be filled in some way, adding to the cost of the finished terminal and detracting to some extent from the finished appearance. As a result of casting a battery terminal connector under these provisions, a novel product is formed as is illustrated in Figs. 1 to 5 inclusive.

As a result there is provided a battery terminal member having a shank 40 that ends in a collar 42, bonded to the conductive element of the battery lead, and embracing an end portion of the insulation, as indicated at 44. Joined to the shank portion there is a split ring or clamp portion 46, ending in the clamp arms 48 and 49, that embraces the reinforcing memer 24, and provides an outer layer of cast metal 50 covering the outside surface of the reinforcing member, and an inside layer 52 covering the inside surface of the reinforcing member 24, the layers 50 and 52 being joined together at the edge of the reinforcing member 24 by the webs 54. The web portions 54 also extend into the notches 32 of the reinforcing member substantially as indicated at 56.

Figure 2:
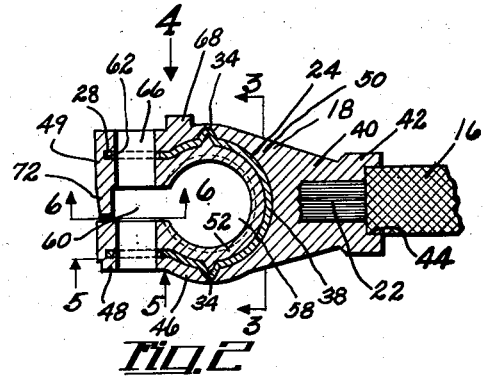
Fig. 2 is a horizontal sectional view through the terminal clamp, removed from the battery post and without the clamping device.
Figure 5:
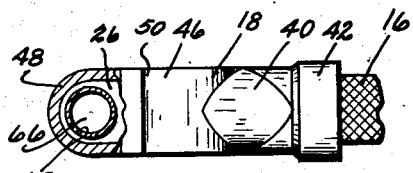
Fig. 5 is a side elevation with parts broken away to show details of construction in section, substantially as indicated by the line and arrows 5—5 of Fig. 2.

The central portion of the clamp member provides a circular opening 58 for reception of the battery terminal member, substantially as indicated in Fig. 1, and a lateral slit 60 opens from the aperture 58 outward between the clamp arms 48 and 49, substantially as illustrated. The drawpin part of the mold elements is sufficiently smaller than the diameter of the apertures 28, to permit a coating of lead to form a lining for the apertures in the form of a sleeve substantially as indicated in Figs. 2 and 5, yet the draw pin is of sufficient cross sectional dimension to allow for easy passage of the clamp device 20, such as the shank of the bolt 64, that is received in the aligned apertures 66 in each of the clamp arms 48 and 49. The casting is otherwise fashioned to provide an abutment 68 to be engaged by one flat side of the head 70 of the clamp bolt 64, and keeps the bolt from turning when the nut of the screw device is run down to secure the clamp arms about the battery post 12.

In order to prevent deformation of the clamp arms, and so as to insure that the clamping force will be more evenly distributed, an abutment or compression lug 72 is formed integral with one of the clamp arms and is so fashioned that it extends across the slit 60, and is adapted to engage the opposite clamp arm, after a certain amount of clamping force has been exerted.

As an obvious alternative, a pair of opposing compression lugs, such as illustrated at 72a and 72b in Fig. 2a, may be provided, one on each clamp arm, so that clamping of the arms will result in engagement of the lugs prior to collapse of the terminal member, as hereinabove set out. Therefore, reference herein to the compression lug, contemplates inclusion of constructions where means are provided between the clamp arms, that operate to prevent the undesirable deformation of the clamp or terminal member.

Figure 2A:
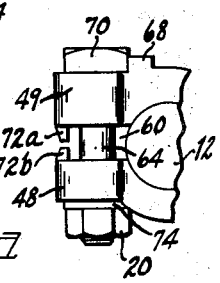
Fig. 2a is a fragmentary plan view of the terminal member applied to a battery post, and illustrating a modification of the terminal member.

With a battery terminal clamp so fashioned it may be readily and securely fixed to a battery terminal post as indicated in Figs. 1 or 2a, without the usual danger of deformation or rupture. With the battery clamp in place, and a hard metal washer 74 disposed on the bolt 64 and positioned between the nut and the clamp arm, secure and efficient electrical connection may be made with certainty. Running the nut down upon the bolt moves the nut against the hard metal washer which eliminates carving away of the clamp arm due to the movement of the nut. The clamping force of the screw device draws the clamp arms together until the abutment 72 engages the opposite clamp arm, or the lug 72a engages 72b, and the reinforcing member 24 distributes the movement of the clamp arms throughout the ring portion of the clamp member, instead of allowing the clamp arms to bend at the juncture of the arms and the ring, as has heretofore been the case. As a result, a more firm engagement is attained between the clamp element and the battery terminal post, and the attendant is informed by the marked increased resistance in turning of the screw device, that a complete electrical connection has been made.

Figure 10:
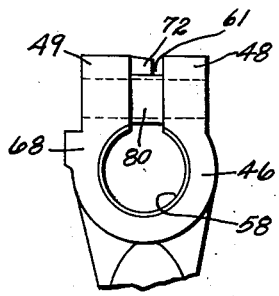
Fig. 10 is a fragmentary view in plan of a modified form of a terminal clamp member.
Figure 11:
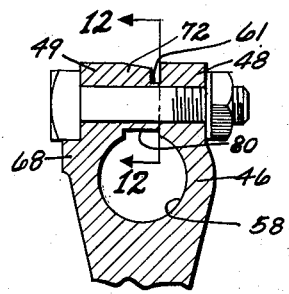
Fig. 11 is a horizontal sectional view through the same, being a view substantially as indicated by the line and arrows 11—11 of Fig. 12.
Figure 12:
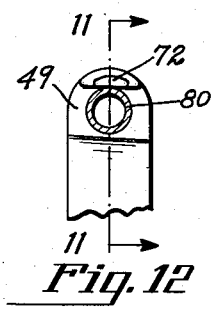
Fig. 12 is a fragmentary view in cross section substantially as indicated by the line and arrows 12—12 of Fig. 11.

A modification of the battery terminal clamp is illustrated in Figs. 10 to 12 inclusive of the drawings, wherein provision is made for isolating the intermediate portion of the clamp bolt 64 from exposure to acid and electrolyte fumes. This feature contemplates a sleeve 80 of the casting metal extending across what would be the slit 60, and is integrally joined at each end to one of the clamp arms 48 and 49 hereinbefore described. The ring portion 46, along with the abutment 68 and the lug 72, or lugs 72a and 72b, are essentially the same as has been heretofore described, and the ring portion embraces the battery terminal aperture 58 as is the usual case. By this construction it will be noted that the would-be slot 60 has been transformed into what may be called a reduced portion integrally joined at each end to the clamp arms 48 and 49, and extending across the slot 60. When the clamp bolt 64 is passed thru the continuous bore 82 thus formed, and tightened upon the battery post, the mutual approach of the clamp arms 48 and 49 will operate to compress endwise the sleeve 80 as the clamp arms are drawn down upon the battery post 12. It will be understood that when a clamp bolt 64 is disposed within the aperture 82, that any portion of the threads thereof situated within the bore 82, between the head 70 and the cooperating nut, will be entirely sealed off as respects the air or atmosphere exterior to the passage 82. Thus, the battery fumes and dilute acids cannot attack the intermediate portion of the bolt 64, and effect any corrosion thereof.

Figure 13:
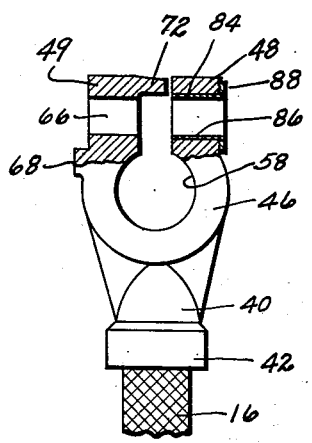
Fig. 13 is a view in elevation with parts broken away to show in section, a modification of the clamp arms.
Figure 14:
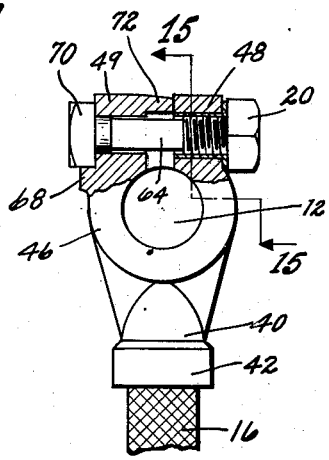
Fig. 14 is a similar view of the second modification illustrating the clamping device in position.
Figure 15:
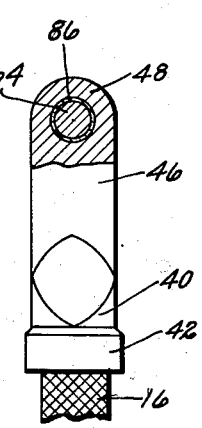
Fig. 15 is a view in side elevation, with parts broken away to show in section, certain features of construction, substantially as indicated by line and arrows 15—15 of Fig. 14.

A second modification is illustrated in Figs. 13 to 15 inclusive of the drawings, that illustrate the features of the battery terminal clamp set forth in the preferred form, in addition to other features directed to the perfection of the battery terminal clamp. In this form, the clamp arm 48 has its bore 84 lined with a hard metal sleeve 86 ending outwardly to end in a flange 88 disposed against the outside surface of the clamp arm, and is adapted to receive the thrust of the screw device 20, and allow for ready turning of the nut upon the bolt 64 without the nut biting into and carving away a portion of the clamp arm. The tubular portion of the sleeve is adapted to extend over the prolonged threads 64 substantially as illustrated in Fig. 14, and sufficiently covers the threads to prevent the soft metal of the casting from entering the threads of the bolt by which binding of the bolt against removal might obtain.

In each of the modifications herein described, it is contemplated that the reinforcing member 24 may be incorporated as has been described with respect to Figs. 1 to 9 inclusive, but for clearness of illustration and disclosure the showing of the reinforcing member in Figs. 10 to 15 has been omitted. Applicant does not forfeit his right thereby to claim the features of the reinforcing element as respects the additional modifications.

In each modification of the invention herein disclosed operation of the screw device to clamp the arms upon a battery post will cause the lug 72, or lugs 72a and 72b, at the extreme ends of the clamp arms to prevent cocking the arms out of parallelism, and/or bending of the clamp arms at their juncture with the clamp ring, and/or bending of the clamp bolt, and/or entry of the soft metal into the threads of the clamp bolt by reason of which binding of the clamp bolt in the apertures in the clamp will result. Thereby, the clamping force effected by the screw device will cause the ring portion of the clamp member to firmly compress about the entire surface of the battery post 12, and will effect good electrical connection, devoid of any breaking or rupture of any part of the battery terminal. Upon release of the clamping device, the bolt 64 may be easily removed and the terminal member removed from the post 12 without difficulty.

While the embodiment of the present invention as herein disclosed, constitutes a preferred form, it is to be understood that other forms might be adopted, all coming within the scope of the claims which follow.

What is claimed is as follows:

1. A battery terminal member of the clamp type, comprising in combination, a casting of soft lead alloy providing an open ring with a pair of arms extending from one side of the ring, said arms being provided with aligned apertures, a screw device comprising a nut with a cooperating bolt disposed in the apertures for drawing the arms together, means including an insert of dead soft metal embedded in the ring for preventing substantial deformation of the arms when the screw device is tightened, and means for preventing binding effect between the clamp arms and the screw device comprising, a tubular extension integrally connected at its ends, each to a clamp arm, so as to embrace the intermediate portion of the clamp device, said tubular means being compressed endwise upon actuation of the clamp device.

2. A battery terminal member of the clamp type, comprising in combination, a casting of soft lead alloy providing an open ring with a pair of laterally extending arms, said arms being provided with aligned apertures, a screw device comprising a nut with a cooperating bolt disposed in the apertures for drawing the arms together, means for preventing substantial deformation of the arms when the screw device is tightened, and means for preventing binding effect between the clamp arms and screw device, comprising a flanged tubular insert lining the aperture of one arm and receivable over the threads of the screw device, said flange ring preventing the flow of the soft lead upon compression of the clamp arms into the threads of the screw device.

3. In a battery terminal clamp comprising an open ring casting of relative soft metal, the combination of a reinforcing member embedded in centralized relation within the casting for preventing fracture of the casting when the terminal is clamped on a battery post, said reinforcing member comprising a strip of dead soft metal, apertured at its ends and bent into U form, the legs of which have outwardly extending pimples situated at points diametrically across the ring, and transversely extending edge projections at the bight, which pimples and projections centrally space the insert within the casting while it is being cast, the metal of the casting substantially covering the pimples and projections and lining the end apertures, said insert being substantially devoid of spring back properties when the clamp is loosened from a terminal post.

4. A battery terminal member of the clamp type, comprising in combination, a casting of soft lead alloy providing an open ring with a pair of laterally extending apertured arms, a screw device disposed in the apertures for drawing the arms together, and means for preventing binding effect between the clamp arms and screw device, comprising a flanged tubular insert lining the aperture of one arm and receivable over the threads of the screw device, said flanged ring providing a hard surface on the clamp arm adjacent the nut of the clamp device to prevent injury to the clamp arm, and forming a sheath over the threads of the bolt for preventing the soft metal from flowing into engagement with the threads of the bolt when the arms are drawn together by the screw device.

5. In a battery terminal clamp the combination comprising, an open ring casting of relative soft metal, a reinforcing member embedded within the casting for preventing fracture of the casting when the terminal is clamped on a battery post, said reinforcing member comprising a strip of dead soft metal, apertured at its ends and bent into U form, the bight of which has oppositely extending projections from the edge of the strip for centering the insert in the casting, and cutaway portions adjacent thereto that reduce the transverse dimension of the strip and increase the bond of cast metal on each side of the insert the end of all of said projections terminating at the surfaces of said casting.

LESLIE C. WOLCOTT.